US00RE44078E

(19) United States
(12) Reissued Patent
Farrell

(10) Patent Number: US RE44,078 E
(45) Date of Reissued Patent: Mar. 19, 2013

(54) MOUTHGUARD

(76) Inventor: Christopher John Farrell, River Down (AU)

(21) Appl. No.: 29/284,092

(22) Filed: Aug. 30, 2007

Related U.S. Patent Documents

Reissue of:
(64) Patent No.: Des. 509,028
Issued: Aug. 30, 2005
Appl. No.: 29/181,852
Filed: May 16, 2003

(51) LOC (9) Cl. ..... 29-02
(52) U.S. Cl. ..... D29/108
(58) Field of Classification Search ..... D29/108, D29/122; D24/176, 180–181; 2/455, 9, 2/424; 128/859, 848, 861–862; 602/902; 433/6
See application file for complete search history.

(56) References Cited

U.S. PATENT DOCUMENTS 3,247,844 A * 4/1966 Berghash ..... 128/862
D215,685 S * 10/1969 Helmer ..... D29/108
3,692,025 A * 9/1972 Greenberg ..... 128/857
5,462,066 A * 10/1995 Snyder ..... 128/848
5,636,379 A * 6/1997 Williams ..... 2/455
D382,965 S * 8/1997 Wagner ..... D29/108
D408,919 S * 4/1999 Cooley ..... D24/181
6,170,485 B1 * 1/2001 Orrico ..... 128/848
6,494,210 B1 * 12/2002 Mams ..... 128/859
D473,976 S * 4/2003 Wilkens ..... D29/108
6,637,436 B2 * 10/2003 Farrell ..... 128/861

* cited by examiner

*Primary Examiner* — Ruth McInroy
(74) *Attorney, Agent, or Firm* — Berenato & White, LLC

(57) CLAIM

The ornamental design for a mouthguard, as shown and described.

DESCRIPTION

FIG. 1 is a top plan view of a mouthguard showing my new design;
FIG. 2 is a bottom plan view thereof;
FIG. 3 is a front view thereof;
FIG. 4 is a rear view thereof; *and,*
FIG. 5 is a side view thereof, the opposite side being a mirror image[;]
[FIG. 6 is a sectional view take along line 6-6 in FIG. 1; and,]
[FIG. 7 is a sectional view taken along line 7-7 in FIG. 1].

1 Claim, 4 Drawing Sheets

Figure 6:
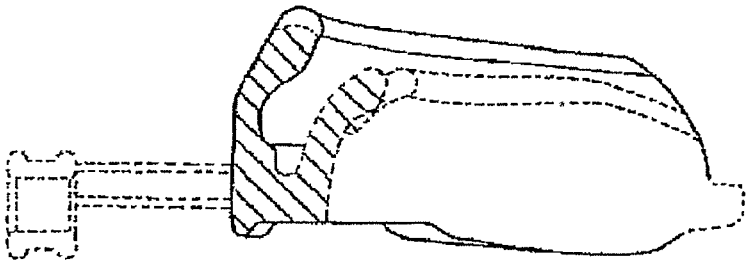
Figure 7:
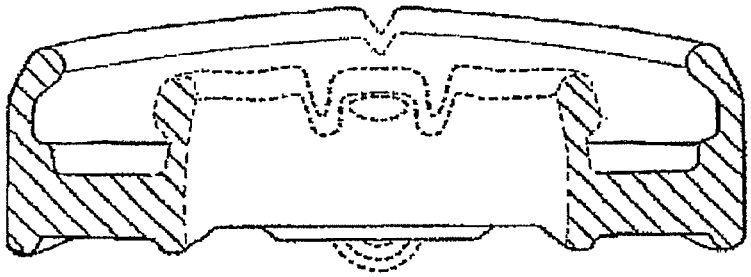

Matter enclosed in heavy brackets [ ] appears in the original patent but forms no part of this reissue; matter printed in italics indicates the additions made by reissue.

(Amended)

(Amended)

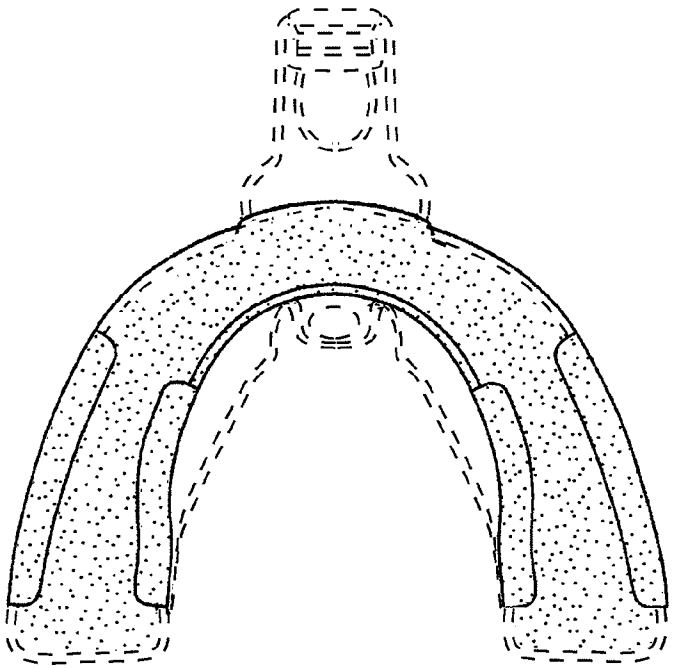
FIG. 2
(Amended)
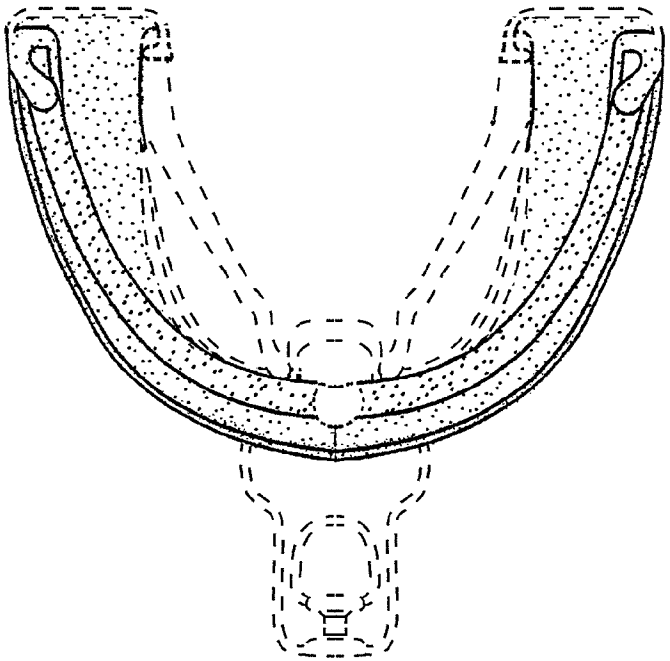
FIG. 1
(Amended)

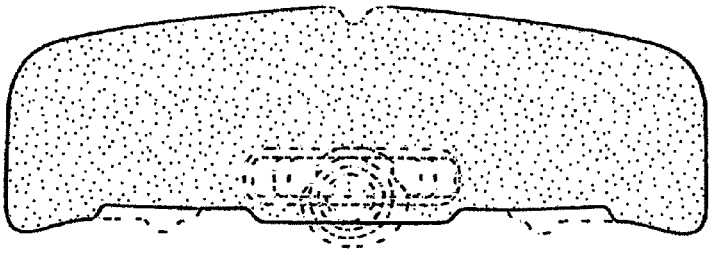
FIG. 3
(Amended)
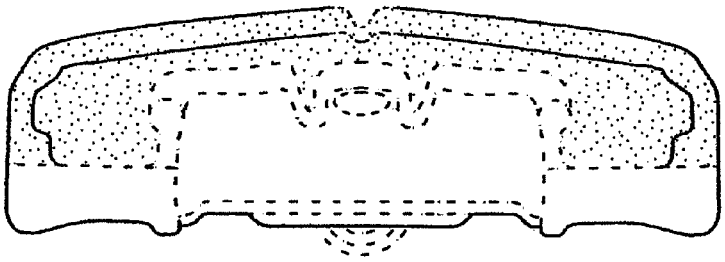
FIG. 4
(Amended)

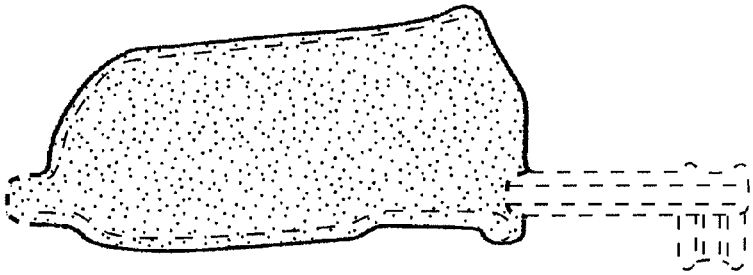
FIG. 5
(Amended)

[Canceled]

[Canceled]